(12) United States Patent
Harada et al.

(10) Patent No.: US 8,399,041 B2
(45) Date of Patent: Mar. 19, 2013

(54) PLASTIC FAT COMPOSITION

(75) Inventors: Kenichi Harada, Hirakata (JP); Masao Iizuka, Hirakata (JP)

(73) Assignee: Riken Vitamin Co., Ltd., Tokyo (JP)

( * ) Notice: Subject to any disclaimer, the term of this patent is extended or adjusted under 35 U.S.C. 154(b) by 735 days.

(21) Appl. No.: 11/992,296

(22) PCT Filed: Sep. 29, 2006

(86) PCT No.: PCT/JP2006/319462
§ 371 (c)(1),
(2), (4) Date: May 27, 2008

(87) PCT Pub. No.: WO2007/037370
PCT Pub. Date: Apr. 5, 2007

(65) Prior Publication Data
US 2009/0162527 A1    Jun. 25, 2009

(30) Foreign Application Priority Data
Sep. 30, 2005   (JP) .................. 2005-285972

(51) Int. Cl.
*A23D 7/005* (2006.01)
*A23D 9/007* (2006.01)

(52) U.S. Cl. ......... 426/602; 426/606; 426/607; 426/611

(58) Field of Classification Search ................. 426/602, 426/606, 607
See application file for complete search history.

(56) References Cited

U.S. PATENT DOCUMENTS

| | | | |
|---|---|---|---|
| 4,263,216 A * | 4/1981 | Volpenhein | 554/164 |
| 5,472,728 A * | 12/1995 | Miller et al. | 426/601 |
| 5,879,735 A * | 3/1999 | Cain et al. | 426/603 |
| 5,912,042 A * | 6/1999 | Cain et al. | 426/607 |
| 5,958,503 A * | 9/1999 | Dumoulin et al. | 426/659 |
| 5,962,058 A * | 10/1999 | Ono et al. | 426/564 |
| 6,146,672 A * | 11/2000 | Gonzalez et al. | 426/94 |
| 6,287,624 B1 * | 9/2001 | Mori et al. | 426/601 |
| 6,713,118 B2 * | 3/2004 | Nakajima et al. | 426/606 |
| 6,764,707 B1 * | 7/2004 | Masui et al. | 426/601 |
| 6,773,741 B1 * | 8/2004 | Masui et al. | 426/602 |
| 6,835,408 B2 * | 12/2004 | Takeuchi et al. | 426/606 |
| 6,844,021 B2 * | 1/2005 | Koike et al. | 426/611 |
| 7,081,542 B2 * | 7/2006 | Jacobs et al. | 554/169 |
| 7,375,240 B2 * | 5/2008 | Maruyama et al. | 554/175 |
| 7,718,204 B2 * | 5/2010 | Soe | 426/33 |
| 7,947,323 B2 * | 5/2011 | Cleenewerck et al. | 426/607 |

FOREIGN PATENT DOCUMENTS

| | | | |
|---|---|---|---|
| JP | 62-81497 | | 4/1987 |
| JP | 05168412 | * | 7/1993 |
| JP | 5-209187 | | 8/1993 |
| JP | 9-143490 | | 6/1997 |
| JP | 2000-270769 | | 10/2000 |
| JP | 2002-161294 | | 6/2002 |
| JP | 2004-204067 | | 7/2004 |
| JP | 2004-359784 | | 12/2004 |

OTHER PUBLICATIONS

Search Report dated Dec. 19, 2006 for International Application No. PCT/JP2006/319462 filed Sep. 29, 2006.

* cited by examiner

*Primary Examiner* — Carolyn Paden
(74) *Attorney, Agent, or Firm* — Drinker Biddle & Reath LLP

(57) ABSTRACT

Provided is a plastic fat composition prepared using only fats and/or oils which are essentially free from trans acid residues as a raw material fat and/or oil, in which coarsening of the fat crystals during storage is suppressed. The fat composition is prepared by blending the fats and/or oils that are essentially free from trans acid residues as a raw material fat and/or oil with a specific mono- and diglycerides of fatty acids. The mono- and diglycerides of fatty acids have a palmitic acid content of 10% or more, and a palmitic acid and stearic acid content of 90% or more, based on 100% of the fatty acid constituting the mono- and diglycerides of fatty acids and are essentially free from trans acids; and have a diester content of 50% by mass or more and monoester content of 5% by mass or less, based on 100% by mass of the mono- and diglycerides of fatty acids.

3 Claims, No Drawings

PLASTIC FAT COMPOSITION

CROSS REFERENCE TO RELATED APPLICATIONS

This application is the National Stage of International Application No. PCT/JP2006/319462 filed Sep. 29, 2006, which claims benefit of Japanese Patent Application No. 2005-285972 filed on Sep. 30, 2005, and which are incorporated by reference herein in their entirety.

TECHNICAL FIELD

The present invention relates to a plastic fat composition prepared using only fats and/or oils, which are essentially free from trans unsaturated fatty acid (hereinafter, referred to as "trans acid") residues as a raw material fat and/or oil.

BACKGROUND ART

Conventionally, suitably blended mixtures of partially hydrogenated oils obtained by hydrogenating animal and vegetable fats and/or oils (hereinafter, referred to as "hydrogenated oil"), vegetable oils being liquid at ordinary temperature and the like are generally used as the raw material fat and/or oil of a plastic fat for confectionary and bakery products. However, such hydrogenated oils contain trans acid residues formed during the hydrogenation process by isomerization of the unsaturated fatty acids which have the same or higher level of unsaturation as linoleic acid. Trans acids are said to substantially increase the risk of cardiac disease, as they increase the level of LDL (so-called "bad cholesterol") in the blood in the same manner as saturated fatty acids.

Recently, as a result of increased health awareness, fats and fat compositions essentially free from trans acid residues are being demanded. However, with combinations of fully hydrogenated oils (hereinafter, referred to as "extremely hydrogenated oils") of animal and vegetable fats and/or oils and vegetable oils being liquid at ordinary temperature, there has been the problems that the mouth feel deteriorate as the blended amount of extremely hydrogenated oil increases, while plasticity is lost if the blended amount of extremely hydrogenated oil is decreased.

To solve this problem, attempts have been made to convert the physical properties of the fats by subjecting an extremely hydrogenated oil and a liquid oil to a transesterification process. For example, a fat composition for producing margarine or shortening has been proposed which is a corandomized fat having a melting point (slipping point) of 20 to 50° C. and which is essentially free from trans acids in the bound fatty acid composition, obtained by transesterification of a palm-oil-based fat and a fat containing a saturated fatty acid having 22 carbon atoms as a constituent fatty acid and/or lower alkyl esters of a saturated fatty acid having 22 carbon atoms, and further, if necessary, oils containing an unsaturated fatty acid having 18 carbon atoms as a main constituent fatty acid (see Patent Document 1).

On the other hand, fats which do not rely on a transesterification process have been proposed, such as a fat composition, essentially free from trans fatty acids, comprising 0.5 to 10% by weight of an extremely hydrogenated fish oil, and 3 to 40% by weight of extremely hydrogenated palm kernel oil and/or extremely hydrogenated coconut oil in its oil phase (see Patent Document 2); a plastic fat composition comprising 10 to 40% by weight of a lauric fat with a melting point of 30° C. or higher in the fat component, wherein in the fatty acid constituting that component the saturated fatty acid content is 35% or less and the trans acid content is 5% or less (see Patent Document 3); and a plastic fat composition comprising in the oil phase 40 to 84.5% by weight of a oil which is liquid at 25° C., 0.5 to 10% by weight of an extremely hydrogenated oil having a melting point of 55° C. or higher, and 15 to 50% by weight of a triacylglycerol represented by $S_LOS_L$ ($S_L$ being saturated fatty acids having 16 to 22 carbon atoms, and O being oleic acid) (see Patent Document 4).

However, even fat compositions obtained by the above-described methods suffer from the drawback of lost smoothness as a result of the fat crystals becoming coarser due to a change in the crystal state of the fat during storage.

Patent Document 1: Japanese Laid-Open Patent Publication No. Sho 62-81497
Patent Document 2: Japanese Laid-Open Patent Publication No. Hei 9-143490
Patent Document 3: Japanese Laid-Open Patent Publication No. 2002-161294
Patent Document 4: Japanese Laid-Open Patent Publication No. 2004-204067

DISCLOSURE OF THE INVENTION

Problems to be Solved by the Invention

It is an object of the present invention to provide a plastic fat composition prepared using only fats and/or oils which are essentially free from trans acid residues as a raw material fat and/or oil, in which coarsening of the fat crystals during storage is suppressed.

Means for Solving the Problems

As a result of intensive investigations into solving the above-described problems, the present inventor found that a desired plastic fat composition can be obtained by using only fats and/or oils which are essentially free from trans acid residues as a raw material fat and/or oil, and blending a specific mono- and diglycerides of fatty acids. Based on this discovery, the present inventor arrived at the present invention.

Specifically, the present invention is:
[1] A plastic fat composition prepared using only fats and/or oils, which are essentially free from trans acid residues as a raw material fat and/or oil, and blending a mono- and diglycerides of fatty acids, wherein the mono- and diglycerides of fatty acids:
(1) has a palmitic acid content of 10% or more, and a palmitic acid and stearic acid content of 90% or more, based on 100% of the fatty acid constituting the mono- and diglycerides of fatty acids, yet is essentially free from trans acids; and
(2) has a diester content of 50% by mass or more and a monoester content of 5% by mass or less, based on 100% by mass of the mono- and diglycerides of fatty acids; and
[2] The plastic fat composition according to the above [1], wherein the blended amount of the mono- and diglycerides of fatty acids is 0.1 to 10 parts by mass based on 100 parts by mass of fat and/or oil component.

Effect of the Invention

Since the plastic fat composition according to the present invention uses fats and/or oils, which are essentially free from trans acid residues, it is nutritionally excellent.

The plastic fat composition according to the present invention has a stable crystal condition of the fat when stored at a low temperature, and even if palm oil or palm oil fraction are used as the raw material fat and/or oil, which are said to be difficult to use in conventional margarines or shortenings, coarse crystals do not form.

BEST MODE FOR CARRYING OUT THE INVENTION

The term "fats and/or oils essentially free from trans acid residues" as used herein refers to fats and/or oils having a trans acid content of less than 5%, preferably approximately 1% or less, based on 100% of the fatty acids constituting the fat and/or oil.

The fats and/or oils used for the blending of the fat composition in the present invention are not especially limited, so long as it is a fat and/or oil essentially free from trans acid residues. Examples thereof include vegetable oils such as olive oil, canola oil, rice-bran oil, safflower oil, high oleic safflower oil, soybean oil, corn oil, rape oil, palm oil, palm kernel oil, sunflower seed oil, high oleic sunflower seed oil, cottonseed oil, coconut oil and peanut oil; animal fats such as beef tallow, lard, fish oil and milk fat; fats and/or oils obtained by a fractionation process (for example, palm olein, palm stearin etc.) or a fully hydrogenation process of these animal and vegetable fats and/or oils, as well as fats obtained by a transesterification process of these animal and vegetable fats and/or oils alone or an arbitrary combination of two or more thereof. These fats and/or oils may be used alone or in an arbitrary combination of two or more thereof.

The mono- and diglycerides of fatty acids used in the blending of the fat composition in the present invention preferably (1) has a palmitic acid content of 10% or more, preferably 20% or more, and especially preferably 40% or more, and a palmitic acid and stearic acid content of 90% or more, based on 100% of the fatty acid constituting the mono- and diglycerides of fatty acids, yet is essentially free from trans acids; and (2) has a diester (diglyceride) content of approximately 50% by mass or more, and preferably approximately 70% by mass or more, and a monoester (monoglyceride) content of 5% by mass or less, based on 100% of the mono- and diglycerides of fatty acids.

A mono- and diglycerides of fatty acids having the above-described characteristics can generally be obtained by adding an alkali as a catalyst to a mixture of a fat and glycerin, and subjecting the resultant mixture to a transesterification reaction under an arbitrary inert gas atmosphere, such as nitrogen or carbon dioxide, by heating in a range of, for example, approximately 180 to 260° C., and preferably approximately 200 to 250° C., for approximately 0.5 to 5 hours, and preferably approximately 1 to 3 hours; or by adding an acid or alkali as a catalyst to a mixture of a fatty acid and glycerin, and subjecting the resultant mixture to an esterification reaction under an arbitrary inert gas atmosphere, such as nitrogen or carbon dioxide, by heating in a range of, for example, approximately 180 to 260° C., and preferably approximately 200 to 250° C., for approximately 0.5 to 5 hours, and preferably approximately 1 to 3 hours, neutralizing the catalyst once the reaction is finished, then expeditiously removing unreacted glycerin and monoglyceride from the obtained reaction mixture. As the method for removing the glycerin and monoglyceride, methods known in the art may be employed, such as distillation under reduced pressure, molecular distillation, column chromatography, liquid-liquid extraction and the like. After removing the glycerin and monoglyceride, treatments such as decolorization, deodoration and the like may be carried out if required.

Furthermore, regardless of the chemical reaction, these reactions may be carried out under milder conditions using, for example, a 1,3-position selective lipase and the like.

The raw material fat and/or oil used in the above-described transesterification reaction are preferably fats and/or oils having a desired fatty acid composition and essentially free from trans acid residues. Examples include extremely hydrogenated rice-bran oil, extremely hydrogenated corn oil, extremely hydrogenated palm oil, extremely hydrogenated cottonseed oil, extremely hydrogenated beef tallow, extremely hydrogenated lard and the like. Furthermore, the raw material fatty acid used in the above-described esterification reaction is preferably a fatty acid derived from the above-described fats and/or oils. Examples include a extremely hydrogenated rice-bran oil fatty acid, a extremely hydrogenated corn oil fatty acid, a extremely hydrogenated palm oil fatty acid, a extremely hydrogenated cottonseed oil fatty acid, a extremely hydrogenated beef tallow fatty acid, a extremely hydrogenated lard fatty acid and the like. In addition, mixed fatty acids may also be used in which various fatty acids such as lauric acid, myristic acid, palmitic acid, stearic acid, behenic acid and the like are mixed to give a desired fatty acid composition.

The embodiments of the plastic fat composition according to the present invention, for example, include water-in-oil emulsions, such as margarine and fat spreads, as well as shortening, which hardly contain any moisture. In this instance, the term "margarine" refers to a product having a fat content of 80% by weight or more in the fat composition, and the term "fat spread" refers to a product having less than 80% by weight.

The method for producing the plastic fat composition according to the present invention is not especially limited, and methods known in the art may be used. A method for producing margarine will now be given as an example. For instance, fats and/or oils and a mono- and diglycerides of fatty acids are mixed, and the resultant mixture are dissolved by heating to approximately 50 to 80° C., and preferably to approximately 60 to 70° C. Antioxidants (for example, extracted tocopherol or the like), colorings (for example, β-carotene or the like), flavorings (for example, milk flavoring or the like), emulsifiers (for example, lecithin or the like) and the like may be added as required into the oil phase. The blended amount of the mono- and diglycerides of fatty acids based on 100 parts by mass of the fat and/or oil component is preferably approximately 0.1 to 10 parts by mass. On the other hand, milk or milk products (for example, whole milk powder, skim milk powder or the like), table salt, sugars, acidifiers (for example, citric acid or the like) and the like may be added as required into purified water, and the resultant mixture is dissolved by heating to approximately 50 to 60° C. to form the aqueous phase. Next, the oil phase and the aqueous phase are mixed using a typical stirring/mixing tank. The obtained liquid mixture is fed to a rapid-cooling kneader by a feed pump, and crystallization and kneading of the fat is continuously carried out to obtain a plastic fat composition. Furthermore, the plastic fat composition may also be obtained without the emulsification step, by respectively feeding the oil phase and the aqueous phase to the rapid-cooling blender with a metering pump and then carrying out the subsequent steps in the same manner.

Shortening may also be produced using the above-described rapid-cooling kneader. Specifically, edible fats and/or oils and a mono- and diglycerides of fatty acids are mixed and the resultant mixture are dissolved by heating to approximately 50 to 80° C., and preferably to approximately 60 to 70° C. Antioxidants (for example, extracted tocopherol or the like), colorings (for example, β-carotene or the like), flavorings (for example, milk flavoring or the like), emulsifiers (for example, lecithin or the like) and the like may be added as required. The blended amount of the mono- and diglycerides of fatty acids based on 100 parts by mass of the fat and/or oil component is preferably approximately 0.1 to 10 parts by mass. The obtained solution is fed to the rapid-cooling kneader by a feed pump via a precooler while blowing nitrogen gas or air in an amount of approximately 10 to 15 mL per 100 g of the composition. Crystallization and kneading of the fat is continuously carried out to obtain a plastic fat composition. The obtained plastic fat composition is preferably further subjected to tempering at approximately 25 to 30° C. for 24 to 48 hours.

Examples of the rapid-cooling kneader include a Votator (manufactured by Chemetron Corporation), a Perfector (manufactured by Gerstenberg Schröder A/S), a Kombinator (manufactured by Gerstenberg Schröder A/S), an Onlator (manufactured by Sakura Seisakusho Ltd.) and the like. These machines are typically constructed from a unit A and a unit B, wherein the unit A comprises a tubular scraped surface-heat exchanger. The unit B uses tubes with different structures depending on the kind of product and objective. For margarine and fat spreads, for example, the tubes are used which are hollow or have a wire mesh provided in the interior, and for shortening, a kneader (pin tube) is used which has pins arranged on the inner wall and the shaft of the tube.

Except the above-described antioxidants, colorings, flavorings, emulsifiers and acidifiers, the plastic fat composition (margarine) according to the present invention may include, as food additives, emulsion stabilizers (for example, sodium caseinate, sodium polyphosphate or the like), seasonings (for example, L-sodium glutamate or the like), thickeners (for example, carrageenan, xanthan gum or the like), preservatives (for example, potassium sorbate or the like), enriched agents (vitamin A fatty acid ester etc.) and the like.

Furthermore, except the above-described antioxidant, coloring, flavoring and emulsifier, the plastic fat composition (shortening) may include, as food additives, antioxidant aids (for example citric acid or the like), antifoaming agents (for example silicone resin or the like) and the like.

EXAMPLES

The present invention will now be described in more detail based on the following examples. However, the present invention is not limited to these examples.

Production Example 1

Into a 1 L, four-necked flask equipped with a stirrer, a thermometer, a gas inlet and a water separator was added 92 g of glycerin and 424 g of extremely hydrogenated palm oil (manufactured by Yokozeki Oil & Fat Corp.). Into the flask was then added 0.14 g of calcium hydroxide (powder) as a catalyst, and a transesterification reaction was carried out for approximately 1 hour at 250° C. under a nitrogen gas flow. The obtained reaction mixture was cooled to approximately 150° C., and 0.3 g of phosphoric acid (85% by mass) was added to neutralize the catalyst. The mixture was left at that temperature for approximately 1 hour, and then filtrated.

The filtrate was distilled under a reduced pressure of approximately 250 Pa at a temperature of approximately 160° C. to remove the glycerin by evaporation. Then, using a centrifugal molecular distillation apparatus (experimental apparatus; CEH-300 II Special; manufactured by ULVAC, Inc.), the mixture was subjected to molecular distillation at approximately 10 Pa and at approximately 200° C. to remove the monoglyceride by evaporation. Next, 1% by mass of activated carbon based on the distillation residue was added. The resultant mixture underwent a decolorization treatment under reduced pressure and was then filtrated, whereby approximately 250 g of a mono- and diglycerides of fatty acids (Test Product 1) having diglyceride as a main component was obtained.

Production Example 2

Into a 1 L, four-necked flask equipped with a stirrer, a thermometer, a gas inlet and a water separator was added 92 g of glycerin and 429 g of extremely hydrogenated beef tallow (manufactured by Yokozeki Oil & Fat Corp.). Into the flask was then added 0.14 g of calcium hydroxide (powder) as a catalyst, and a transesterification reaction was carried out for approximately 1 hour at 250° C. under a nitrogen gas flow. The obtained reaction mixture was cooled to approximately 150° C., and 0.3 g of phosphoric acid (85% by mass) was added to neutralize the catalyst. The mixture was left at that temperature for approximately 1 hour, and then filtrated.

The filtrate was distilled under a reduced pressure of approximately 250 Pa at a temperature of approximately 160° C. to remove the glycerin by evaporation. Then, using a centrifugal molecular distillation apparatus (experimental apparatus; CEH-300 II Special; manufactured by ULVAC, Inc.), the mixture was subjected to molecular distillation at approximately 10 Pa and at approximately 200° C. to remove the monoglyceride by evaporation. Next, 1% by mass of activated carbon based on the distillation residue was added. The resultant mixture underwent a decolorization treatment under reduced pressure and was then filtrated, whereby approximately 250 g of a mono- and diglycerides of fatty acids (Test Product 2) having diglyceride as a main component was obtained.

Production Example 3

Into a 1 L, four-necked flask equipped with a stirrer, a thermometer, a gas inlet and a water separator was added 92 g of glycerin and 424 g of palm oil (manufactured by J-Oil Mills, Inc.). Into the flask was then added 0.14 g of calcium hydroxide (powder) as a catalyst, and a transesterification reaction was carried out for approximately 1 hour at 250° C. under a nitrogen gas flow. The obtained reaction mixture was cooled to approximately 150° C., and 0.3 g of phosphoric acid (85% by mass) was added to neutralize the catalyst. The mixture was left at that temperature for approximately 1 hour, and then filtrated.

The filtrate was distilled under a reduced pressure of approximately 250 Pa at a temperature of approximately 160° C. to remove the glycerin by evaporation. Then, using a centrifugal molecular distillation apparatus (experimental apparatus; CEH-300 II Special; manufactured by ULVAC, Inc.), the mixture was subjected to molecular distillation at approximately 10 Pa and at approximately 200° C. to remove the monoglyceride by evaporation. Next, 1% by mass of activated carbon based on the distillation residue was added. The resultant mixture underwent a decolorization treatment under reduced pressure and was then filtrated, whereby approximately 250 g of a mono- and diglycerides of fatty acids (Test Product 3) having diglyceride as a main component was obtained.

Production Example 4

Into a 1 L, four-necked flask equipped with a stirrer, a thermometer, a gas inlet and a water separator was added 28 g of glycerin and 594 g of extremely hydrogenated palm oil (manufactured by Yokozeki Oil & Fat Corp.). Into the flask was then added 0.20 g of calcium hydroxide (powder) as a catalyst, and a transesterification reaction was carried out for approximately 1 hour at 250° C. under a nitrogen gas flow. The obtained reaction mixture was cooled to approximately 150° C., and 0.4 g of phosphoric acid (85% by mass) was added to neutralize the catalyst. The mixture was left at that temperature for approximately 1 hour, and then filtrated.

The filtrate was distilled under a reduced pressure of approximately 250 Pa at a temperature of approximately 160° C. to remove the glycerin by evaporation. Next, 1% by mass of activated carbon based on the distillation residue was added. The resultant mixture underwent a decolorization treatment under reduced pressure and was then filtrated, whereby approximately 610 g of a mono- and diglycerides of fatty acids (Test Product 4) having diglyceride as a main component was obtained.

Test Example 1

The fatty acid compositions of the extremely hydrogenated palm oil, extremely hydrogenated beef tallow and palm oil used in Production Examples 1 to 4 were determined.

Preparation of the Samples for Determination was Carried Out in accordance with "2.4.1.2 Preparation of Methyl Esters of Fatty Acids (Boron Trifluoride-Methanol Method)" of the "Standard Method for the Analysis of Fats, Oils and Related Materials (1996)" (edited by Japan Oil Chemists' Society). Furthermore, determination was carried out in accordance with "2.4.2.2 Fatty Acids Composition (FID Temperature programmed Gas Chromatography)" of the "Standard Method for the Analysis of Fats, Oils and Related Materials (1996)" (edited by Japan Oil Chemists' Society). As for quantification, the fatty acid composition was obtained from the percentages of each peak area with respect to the total peak area recorded by a data processor. The results are shown in Table 1.

TABLE 1

|  | Extremely Hydrogenated Palm Oil | Extremely Hydrogenated Beef Tallow | Palm Oil |
| --- | --- | --- | --- |
| C12:0 | 0.1 |  | 0.3 |
| C14:0 | 1.0 | 4.0 | 1.1 |
| C15:0 |  | 0.1 |  |
| C16:0 | 42.5 | 29.0 | 44.1 |
| C16:1 |  |  | 0.2 |
| C17:0 |  | 0.7 |  |
| C18:0 | 55.1 | 64.9 | 4.5 |
| C18:1 |  |  | 40.1 |
| C18:2 |  |  | 9.1 |
| C20:0 | 1.0 | 1.0 |  |
| C20:1 |  |  | 0.6 |

Units for the values in the table are by "%."

Test Example 2

The trans acid content of the extremely hydrogenated palm oil, extremely hydrogenated beef tallow and palm oil used in Production Examples 1 to 4 was measured.

Preparation of the Samples for the Measurement was Carried out in accordance with "2.4.1.2 Preparation of Methyl Esters of Fatty Acids (Boron Trifluoride-Methanol Method)" of the "Standard Method for the Analysis of Fats, Oils and Related Materials (1996)" (edited by Japan Oil Chemists' Society). Furthermore, measurement was carried out in accordance with "2.4.4.1 Isolated Trans Isomers (Differential Infrared Spectrophotometry)" of the "Standard Method for the Analysis of Fats, Oils and Related Materials (1996)" (edited by Japan Oil Chemists' Society). The results are shown in Table 2.

TABLE 2

|  | Extremely Hydrogenated Palm Oil | Extremely Hydrogenated Beef Tallow | Palm Oil |
| --- | --- | --- | --- |
| Trans Acid Content | trace | trace | ND |

ND: Not detected

Test Example 3

The monoester (monoglyceride) content and diester (diglyceride) content in the glycerin fatty acid esters (Test Products 1 to 4) produced in Production Examples 1 to 4 were measured.

Measurement was carried out by HPLC, and quantification was carried out by an absolute calibration curve method. Specifically, the peak areas corresponding to the monoglyceride and the diglyceride of the target sample recorded on a chromatogram by a data processor were measured, and the monoester content and diester content (% by mass) in the target test sample were determined from a calibration curve plotted with glycerin monostearate and glycerin distearate purified by normal phase column chromatography as standard samples. The results are shown in Table 3.

The HPLC analysis conditions are shown below.
<HPLC Analysis Conditions>
Apparatus: Shimadzu high performance liquid chromatograph
  Pump (model: LC-10A; manufactured by Shimadzu Corporation)
  Column oven (model: CTO-10A; manufactured by Shimadzu Corporation)
  Data processor (model: C-R7A; manufactured by Shimadzu Corporation)
Column: GPC column (model: Shodex KF-802; manufactured by Showa Denko K.K.)
  Two columns coupled together
Mobile phase: THF
Flow amount: 1.0 mL/min
Detector: RI Detector (model: RID-6A; manufactured by Shimadzu Corporation)
Column temperature: 40° C.
Detection fluid injected amount: 15 µL (in THF)

TABLE 3

|  | Test Product | | | |
| --- | --- | --- | --- | --- |
|  | 1 | 2 | 3 | 4 |
| Glycerin | ND | ND | ND | ND |
| Monoglyceride | 4.0 | 3.9 | 4.1 | 10.5 |
| Diglyceride | 77.6 | 77.7 | 77.5 | 42.4 |
| Triglyceride*[1] | 18.4 | 18.4 | 18.4 | 47.1 |

ND: Not detected
Units for the values in the table are by "% by mass."
*[1]The triglyceride content (% by mass) was calculated according to the following equation.
Triglyceride content = 100 − (monoglyceride + diglyceride) content

Example 1

Margarine (Samples Nos. 1 to 4) blended with the mono- and diglycerides of fatty acids produced in Production Examples 1 to 4 and, as a control, margarine (Sample No. 5) not blended with a mono- and diglycerides of fatty acids were prepared and evaluated.

[Margarine Production-1 (Sample Nos. 1 to 4)]

(1) To 16 parts by mass of purified water was added 1 part by mass of table salt and 2 parts by mass of skim milk powder. The resultant mixture was dissolved, and then heated to approximately 40° C. to form an aqueous phase.

(2) To 100 parts by mass of a blended oil (trans acid content: ND) comprising 80% by mass of palm oil (manufactured by J-Oil Mills, Inc.), 15% by mass of rape seed oil (manufactured by The Nisshin OilliO Group, Ltd.) and 5% by mass of palm stearin (manufactured by Fuji Oil Co., Ltd.) was added 5 parts by mass of a mono- and diglycerides of fatty acids (Test Product Nos. 1 to 4) and 0.1 parts by mass of lecithin (product name: SLP Paste; manufactured by Tsuji Oil Mill Co., Ltd.). The resultant mixture was dissolved, and then heated to approximately 60° C. to form an oil phase.

(3) While stirring the aqueous phase of (1) at low speed with a TK Homomixer (model: Mark II; manufactured by Primix Corporation), 81 parts by mass of the oil phase prepared in (2) was slowly added therein. The emulsion at first exhibited an O/W type, but then reversed phases and in the end was a W/O type.

(4) The obtained emulsion was kneaded under rapid cooling by a common method to obtain margarine (Sample Nos. 1 to 4).

[Margarine Production-2 (Sample No. 5)]

(1) To 16 parts by mass of purified water was added 1 part by mass of table salt and 2 parts by mass of skim milk powder. The resultant mixture was dissolved, and then heated to approximately 40° C. to form an aqueous phase.

(2) To 100 parts by mass of a blended oil (trans acid content: ND) comprising 80% by mass of palm oil (manufactured by J-Oil Mills, Inc.), 15% by mass of rape seed oil (manufactured by The Nisshin OilliO Group, Ltd.) and 5% by mass of palm stearin (manufactured by Fuji Oil Co., Ltd.) was added 0.1 parts by mass of lecithin (product name: SLP Paste; manufactured by Tsuji Oil Mill Co., Ltd.). The resultant mixture was dissolved, and then heated to approximately 60° C. to form an oil phase.

(3) While stirring the aqueous phase of (1) at low speed with a TK Homomixer (model: Mark II; manufactured by Primix Corporation), 81 parts by mass of the oil phase prepared in (2) was slowly added therein.

(4) The obtained emulsion was kneaded under rapid cooling by a common method to obtain margarine (Sample No. 5).

[Margarine Evaluation]

The obtained margarines (Sample Nos. 1 to 5) were stored for 30 days at 5° C., and then subjected to the following tests. The results are shown in Table 5.

Test 1: The size of the fat crystals was measured by using a light microscope.

Test 2: Ten grams was cut from each sample, and spread on the surface of a piece of bread with a butter knife under an environment having a temperature of approximately 20° C. The bread was tasted, and spreadability and texture were evaluated in accordance with the evaluation criteria shown in the following Table 4.

A sensory test was carried out with 10 panelists. The results were determined as the average value of the evaluation from the 10 panelists, and are represented using symbols according to the following criteria.

◯: 2.5 or higher
Δ: 1.5 or higher to less than 2.5
X: Less than 1.5

TABLE 4

| Evaluation Item | Evaluation | Evaluation Criteria |
|---|---|---|
| Spreadability | 3 | Thinly and easily spread. |
| | 2 | Difficult to spread thinly. Slightly lacking in smoothness. |
| | 1 | Could not spread thinly. |
| Texture | 3 | Smooth feeling on the tongue. Good. |
| | 2 | Slight grainy feeling. |
| | 1 | Obviously grainy. Not good. |

TABLE 5

| | Margarine (Sample No.) | Mono- and Diglycerides of Fatty Acids | Size of Fat Crystals (μm) | Spreadability | Texture |
|---|---|---|---|---|---|
| Example | 1 | Test Product 1 | 3-5 | ◯ | ◯ |
| | 2 | Test Product 2 | 5-10 | ◯ | ◯ |
| Comparative Example | 3 | Test Product 3 | 30-40 | X | X |
| | 4 | Test Product 4 | 15-30 | Δ | X |
| Control | 5 | None | 30-50 | X | X |

As is clear from Table 5, the margarine of the examples had small fat crystals, and as a result spreadability and texture were both good.

In contrast, the margarine of the comparative example had large fat crystals, and as a result spreadability was poor and the feeling on the tongue was clearly-grainy, and thus was not good.

INDUSTRIAL APPLICABILITY

The plastic fat composition according to the present invention can be used as a fat for confectionary and bakery products used when producing sponge cakes, butter cakes, bread, Danish pastries, pies, cookies, crackers, puffs, icing and the like, as well as a margarine used at home, a margarine used for school meals and the like.

The invention claimed is:

1. A plastic fat composition having a fat content of 77.1% by weight or more, wherein said plastic fat composition comprises water and fats and/or oil in a water-in-oil emulsion, wherein the oil phase of the water-in-oil emulsion comprises a composition prepared from fats and/or oils, which are essentially free from trans acid residues as a raw material, blended with a mono- and diglycerides of fatty acids product that is essentially free from trans acid residues, wherein the mono- and diglycerides of fatty acids product:

(1) has a palmitic acid content of 10% or more, and a palmitic acid and stearic acid content of 90% or more, based on 100% of the fatty acid constituting the mono- and diglycerides of fatty acids product, yet is essentially free from trans acids; and (2) has a diester content of 50% by mass or more and a monoester content of 5% by mass or less, based on 100% by mass of the mono- and diglycerides of fatty acids product.

2. The plastic fat composition according to claim 1, wherein the blended amount of the mono- and diglycerides of fatty acids product is 0.1 to 10 parts by mass based on 100 parts by mass of fat and/or oil component.

3. A plastic fat composition of shortening, wherein said plastic fat composition is prepared from fats and/or oils, which are essentially free from trans acid residues as a raw material, blended with a mono- and diglycerides of fatty acids product that is essentially free from trans acid residue, wherein the mono- and diglycerides of fatty acids product:
  (1) has a palmitic acid content of 10% or more, and a palmitic acid and stearic acid content of 90% or more, based on 100% of the fatty acid constituting the mono- and diglycerides of fatty acids product, yet is essentially free from trans acids; and
  (2) has a diester content of 50% by mass or more and a monoester content of 5% by mass or less, based on 100% by mass of the mono- and diglycerides of fatty acids product, and
wherein the blended amount of the mono- and diglycerides of fatty acids product is 0.1 to 10 parts by mass based on 100 parts by mass of fat and/or oil component.

* * * * *